United States Patent
Hosoi et al.

(10) Patent No.: US 10,629,925 B2
(45) Date of Patent: Apr. 21, 2020

(54) FUEL CELL SYSTEM

(71) Applicant: TOYOTA JIDOSHA KABUSHIKI KAISHA, Toyota-shi, Aichi-ken (JP)

(72) Inventors: Takami Hosoi, Toyota (JP); Michitaro Itoga, Okazaki (JP); Michihiko Masuda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 199 days.

(21) Appl. No.: 15/873,097

(22) Filed: Jan. 17, 2018

(65) Prior Publication Data
US 2018/0205100 A1  Jul. 19, 2018

(30) Foreign Application Priority Data

Jan. 18, 2017  (JP) ................. 2017-006788

(51) Int. Cl.
| | | |
|---|---|---|
| *H01M 8/04119* | (2016.01) | |
| *H01M 8/04223* | (2016.01) | |
| *H01M 8/0432* | (2016.01) | |
| *H01M 8/04492* | (2016.01) | |

(Continued)

(52) U.S. Cl.
CPC ... *H01M 8/04164* (2013.01); *H01M 8/04179* (2013.01); *H01M 8/04253* (2013.01); *H01M 8/04302* (2016.02); *H01M 8/04343* (2013.01); *H01M 8/04373* (2013.01); *H01M 8/04507* (2013.01); *H01M 8/04753* (2013.01); *H01M 8/04776* (2013.01); *H01M 2250/20* (2013.01); *Y02T 90/32* (2013.01)

(58) Field of Classification Search
CPC ......... H01M 8/04164; H01M 8/04179; H01M 8/04507; H01M 8/04343; H01M 8/04253; H01M 2250/20; H01M 8/04302; H01M 8/04776; H01M 8/04753; H01M 8/04373; H01M 2008/1095; H01M 8/0662; H01M 8/04201; H01M 8/1007; Y02T 90/32
See application file for complete search history.

(56) References Cited

U.S. PATENT DOCUMENTS

2006/0063049 A1\* 3/2006 Fujita ................ H01M 8/04223
                                                                429/414
2010/0035107 A1\* 2/2010 Kanie ............... H01M 8/04097
                                                                429/431

(Continued)

FOREIGN PATENT DOCUMENTS

| JP | 2007-280771 | 10/2007 |
|---|---|---|
| JP | 2008-78046 | 4/2008 |
| JP | 2009-104966 | 5/2009 |

(Continued)

*Primary Examiner* — Lisa S Park
(74) *Attorney, Agent, or Firm* — Finnegan, Henderson, Farabow, Garrett & Dunner, LLP (57) ABSTRACT

When a shut-off valve is opened, gas is discharged via a main passage which is disposed at a predetermined height from a bottom of a gas-liquid separator. Water which gathers in the bottom of the gas-liquid separator flows from a bypass passage to the main passage and is discharged when water level difference>height is satisfied. When water which gathers in the bottom of the gas-liquid separator is supercooled water, discharge of water is avoided by controlling an open pressure and a passage pressure such that water level difference<height is satisfied.

7 Claims, 5 Drawing Sheets

(51) Int. Cl.
*H01M 8/04746* (2016.01)
*H01M 8/04302* (2016.01)

(56) References Cited

U.S. PATENT DOCUMENTS

| 2010/0055523 | A1* | 3/2010 | Ogawa | H01M 8/04164 |
| | | | | 429/426 |
| 2013/0202979 | A1* | 8/2013 | Katano | H01M 8/04761 |
| | | | | 429/444 |

FOREIGN PATENT DOCUMENTS

| JP | 2009-110817 | 5/2009 |
| JP | 2011-14429 | 1/2011 |

* cited by examiner

FUEL CELL SYSTEM

INCORPORATION BY REFERENCE

The disclosure of Japanese Patent Application No. 2017-006788 filed on Jan. 18, 2017 including the specification, drawings and abstract is incorporated herein by reference in its entirety.

BACKGROUND

1. Technical Field

The present disclosure relates to drainage from a gas-liquid separator.

2. Description of Related Art

Japanese Unexamined Patent Application Publication No. 2011-014429 (JP 2011-014429 A) discloses that an exhaust port capable of exhausting only gas in addition to a discharge port for discharging water as a liquid is provided in a gas-liquid separator which is included in a fuel cell system. The gas-liquid separator is disposed in a circulation passage of anode gas. The discharge port and the exhaust port are opened and shut by valves.

SUMMARY

Water which gathers in a gas-liquid separator may be present as supercooled water. When supercooled water is present and a valve for discharging water is opened, the supercooled water flows into the valve even if the water level in the gas-liquid separator is lower than the position of the valve. As a result, the supercooled water becomes attached to the valve. The supercooled water attached to the valve may change to ice and be continuously attached thereto. When ice is attached to the valve, opening and closing of the valve may not be able to be performed normally. The present disclosure is for achieving prevention of supercooled water from being attached to a valve in consideration of the above-mentioned circumstances.

According to an aspect of the present disclosure, there is provided a fuel cell system including: a gas-liquid separator configured to separate water and gas which flows from a fuel cell stack; a discharge passage connected to the gas-liquid separator to discharge a fluid from the gas-liquid separator to atmospheric air; a valve disposed between the gas-liquid separator and the discharge passage; a gas control mechanism configured to change a pressure of gas in the gas-liquid separator; an information acquiring unit configured to acquire information for estimating a temperature of water in the gas-liquid separator; and a control unit configured to control the gas control mechanism using the information acquired by the information acquiring unit, wherein the gas-liquid separator includes a main passage configured for the fluid to flow to the valve in a horizontal direction at a predetermined height from a bottom surface of the gas-liquid separator and a bypass passage configured to join to the main passage from the bottom surface side, and wherein the control unit is configured to control a pressure in the gas-liquid separator using the gas control mechanism such that a water surface in the bypass passage is lower than the predetermined height when the information acquired by the information acquiring unit indicates a supercooled state and the valve is opened. According to this aspect, when it is estimated that there is supercooled water, the water surface in the bypass passage is lower than the main passage and thus supercooled water does not flow into the valve. Accordingly, it is possible to prevent supercooled water from becoming attached to the valve.

In the aspect, the control unit may be configured to control the pressure in the gas-liquid separator such that the pressure has a value at which water is not discharged based on the value acquired by an atmospheric pressure acquiring unit.

In the aspect, the control unit may be configured to open the valve after the pressure in the gas-liquid separator is controlled such that the pressure has the value at which water is not discharged and to estimate whether water in the gas-liquid separator is in a supercooled state.

In the aspect, the fuel cell system may further include an atmospheric pressure acquiring unit configured to acquire a value of an atmospheric pressure, and the control unit may be configured to control the pressure in the gas-liquid separator based on the value acquired by the atmospheric pressure acquiring unit. According to this aspect, it is possible to implement more appropriate control.

In the aspect, the gas control mechanism may be an injector configured to supply hydrogen to the fuel cell stack from a hydrogen tank. According to this aspect, it is not necessary to separately provide a mechanism that controls a pressure in the gas-liquid separator.

In the aspect, the control unit may be configured to perform control of the pressure in the gas-liquid separator when the fuel cell system is started. When the fuel cell system operates continuously, there is little likelihood that supercooled water will be generated in the gas-liquid separator and there is little necessity for performing control of a pressure in the gas-liquid separator. According to this aspect, when there is little likelihood that there will be supercooled water, the control of a pressure may not be performed. That is, it is not necessary to acquire information indicating whether there is supercooled water.

In the aspect, the control unit may be configured to open the valve for a predetermined time when it is estimated that water in the gas-liquid separator is not in the supercooled state and to end control of the pressure in the gas-liquid separator.

The present disclosure can be embodied in various forms other than described above. For example, the present disclosure can be embodied in the forms of a discharge method, a program for implementing the discharge method, and a non-transitory storage medium having the program stored therein.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
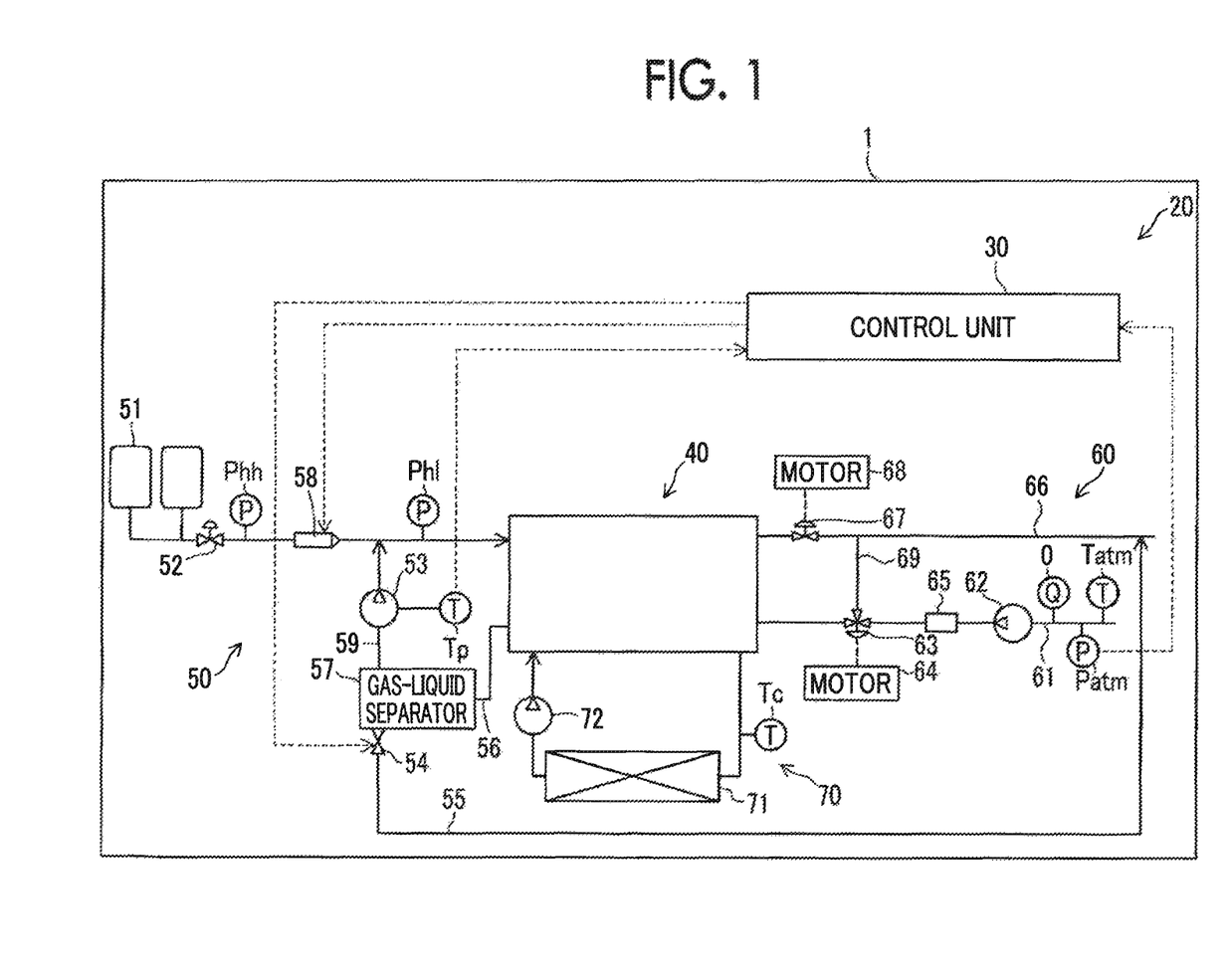
FIG. 1 is a diagram schematically illustrating a configuration of a fuel cell system.

FIG. 1 is a diagram schematically illustrating a configuration of a fuel cell system 20. The fuel cell system 20 is mounted in a vehicle 1. The fuel cell system 20 employs a solid polymer fuel cell and generates electric power by a reaction between anode gas and cathode gas. The anode gas is hydrogen. The cathode gas is oxygen in air. The fuel cell system 20 includes a fuel cell stack 40, a hydrogen supply and discharge mechanism 50, an air supply and discharge mechanism 60, a coolant circulation mechanism 70, and a control unit 30 as illustrated in FIG. 1.

The hydrogen supply and discharge mechanism 50 that supplies and discharges hydrogen to and from an anode of the fuel cell stack 40 includes a hydrogen tank 51, a regulator 52, a hydrogen pump 53, a shut-off valve 54, a discharge passage 55, an inflow pipe 56, a gas-liquid separator 57, an injector 58, an outflow pipe 59, a high-pressure manometer Phh, a low-pressure manometer Phl, and a thermometer Tp.

The hydrogen tank 51 stores hydrogen. The regulator 52 adjusts a pressure of hydrogen stored in the hydrogen tank 51 and then supplies the hydrogen to the injector 58. The injector 58 injects the supplied hydrogen to the anode under the control of the control unit 30. By controlling a flow rate of hydrogen which is injected by the injector 58, an amount of hydrogen supplied to the fuel cell stack 40 is adjusted.

The inflow pipe 56 connects an outlet of anode gas of the fuel cell stack 40 to the gas-liquid separator 57. The outflow pipe 59 connects the gas-liquid separator 57 to the hydrogen pump 53. The gas-liquid separator 57 will be described later.

The hydrogen pump 53 supplies gas which flows from the outflow pipe 59 to the fuel cell stack 40 again.

The discharge passage 55 is a passage that connects the gas-liquid separator 57 to an air discharge passage 66 (which will be described later) disposed in the air supply and discharge mechanism 60. The shut-off valve 54 is disposed between the discharge passage 55 and the gas-liquid separator 57. The shut-off valve 54 will also be described later.

The high-pressure manometer Phh measures a pressure of hydrogen between the regulator 52 and the injector 58. The low-pressure manometer Phl measures a pressure of hydrogen (hereinafter referred to as a supply pressure) before hydrogen flows into the fuel cell stack 40. The thermometer Tp measures a temperature of the hydrogen pump 53. More specifically, the thermometer Tp measures a temperature of a motor core built into the hydrogen pump 53.

The air supply and discharge mechanism 60 that supplies and discharges air to a cathode of the fuel cell stack 40 includes an air supply passage 61, a compressor 62, a flow dividing valve 63, a flow dividing valve motor 64, an intercooler 65, an air discharge passage 66, a pressure control valve 67, a pressure control valve motor 68, a shunt passage 69, a barometer Patm, an outside air thermometer Tatm, and a flowmeter Q.

The air supply passage 61 and the air discharge passage 66 are passages that connect the fuel cell stack 40 to their atmospheric air openings. The compressor 62 is disposed in the middle of the air supply passage 61 and takes in and compresses air from the atmospheric air opening of the air supply passage 61. The position at which the compressor 62 is disposed is a position closer to the atmospheric air opening than a junction of the air supply passage 61 and the shunt passage 69 is.

The intercooler 65 cools air which has been compressed by the compressor 62. The flow dividing valve 63 is disposed downstream from the intercooler 65, that is, between the intercooler 65 and the fuel cell stack 40, in the air supply passage 61. The flow dividing valve 63 divides air flowing from the intercooler 65 into a downstream side of the air supply passage 61 and the shunt passage 69. Such a valve is referred to as a three-way valve.

The flow dividing valve motor 64 is connected to the flow dividing valve 63 and generates a torque for adjusting a degree of opening of the flow dividing valve 63. The shunt passage 69 is a passage that connects the flow dividing valve 63 to the air discharge passage 66.

The pressure control valve 67 is provided in the air discharge passage 66. The pressure control valve 67 adjusts a passage sectional area of the air discharge passage 66 depending on the degree of opening. A junction of the shunt passage 69 and the air discharge passage 66 is located downstream from the position of the pressure control valve 67 in the air discharge passage 66. The pressure control valve motor 68 is connected to the pressure control valve 67 and generates a torque for adjusting a degree of opening of the pressure control valve 67.

Air passing through the pressure control valve 67 passes through the junction with the shunt passage 69 and is then discharged from the atmospheric air opening to the atmospheric air.

The flowmeter Q measures a flow rate of air taken in by the compressor 62 (hereinafter referred to as intake air). The outside air thermometer Tatm measures a temperature of the intake air. The barometer Patm measures a pressure of the intake air.

The coolant circulation mechanism 70 that cools the fuel cell stack 40 includes a radiator 71, a coolant pump 72, and a coolant thermometer Tc. The coolant pump 72 circulates a coolant between the fuel cell stack 40 and the radiator 71 to control an operating temperature of the fuel cell stack 40. The circulated coolant is subject to absorption of heat in the fuel cell stack 40 and radiation of heat in the radiator 71. The coolant thermometer Tc measures a discharge temperature of a coolant. The discharge temperature is a temperature of a coolant which is discharged from the fuel cell stack 40 and has not flowed into the radiator 71 yet.

The control unit 30 is specifically, an electronic control unit (ECU). The control unit 30 outputs signals for controlling the operation of the fuel cell system 20. For example, when a starting pressure control process which will be described later is performed, the control unit 30 acquires a measured value of the thermometer Tp and outputs a control signal to the injector 58. The control unit 30 stores a program for performing the starting pressure control process.

Figure 2:
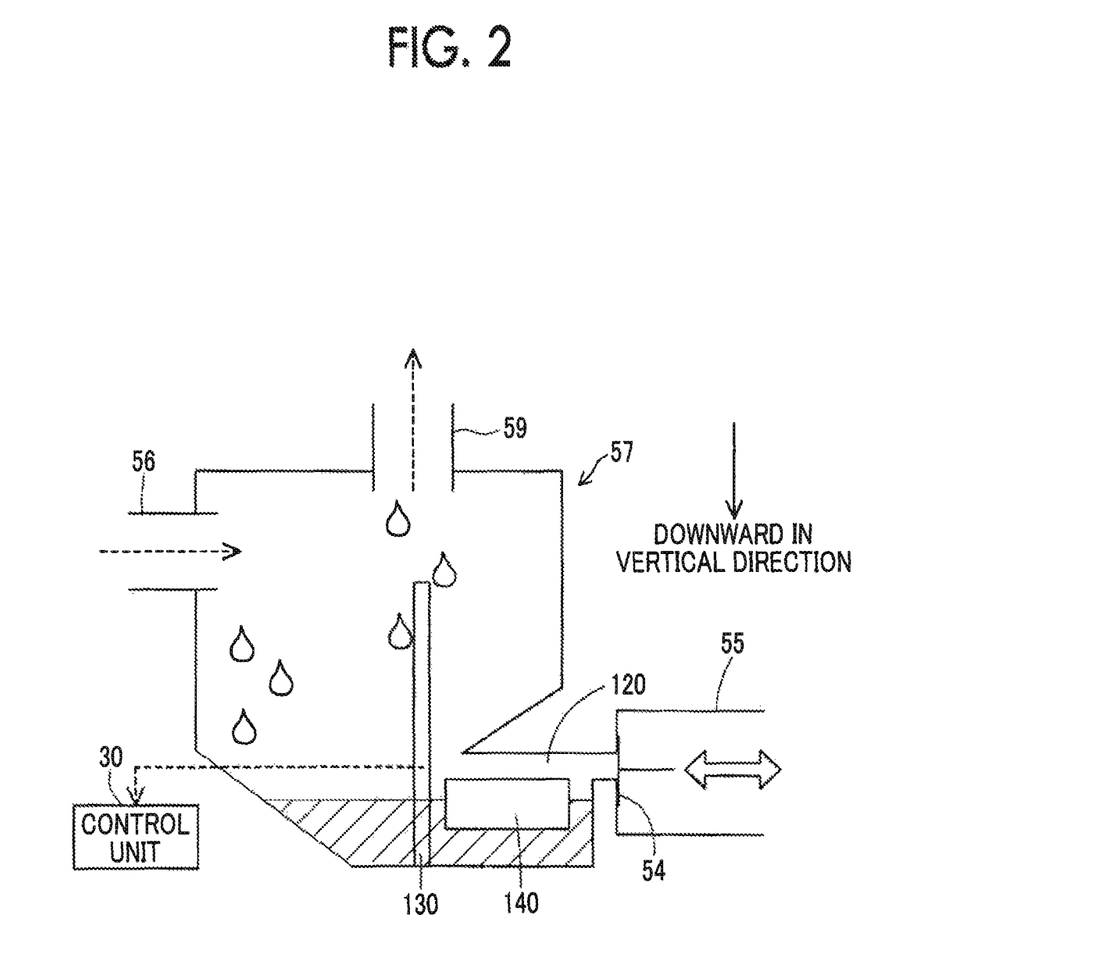
FIG. 2 is a diagram schematically illustrating a section of a gas-liquid separator.

FIG. 2 schematically illustrates a section of the gas-liquid separator 57. The gas-liquid separator 57 includes a main passage 120, a water level gauge 130, and a partition 140.

The function of the gas-liquid separator 57 will be first described before the elements will be described. The gas-liquid separator 57 is a vessel that is used to separate gas and water which flow from the inflow pipe 56. In this embodiment, when water is mentioned, it refers to water as a liquid.

Gas which is separated mainly includes hydrogen, nitrogen, and steam. Hydrogen is not consumed by the fuel cell stack 40, but is discharged therefrom and flows from the fuel cell stack 40 into the gas-liquid separator 57. Nitrogen is transmitted from the cathode to the anode in the fuel cell stack 40 and flows from the fuel cell stack 40 into the gas-liquid separator 57. Steam is generated by vaporizing water produced by a power generation reaction in the fuel cell stack 40.

In order to realize the separation, the outflow pipe 59 is connected to the top of the gas-liquid separator 57. Top and bottom in this embodiment are top and bottom in the vertical direction. The inflow pipe 56 is connected to a side surface of the gas-liquid separator 57. The position in the up-down direction of a junction of the inflow pipe 56 is a position close to the top of the gas-liquid separator 57.

With the above-mentioned arrangement, most of water flowing from the inflow pipe 56 does not flow to the outflow pipe 59 due to an action of gravity and drops to the bottom of the gas-liquid separator 57.

When the shut-off valve 54 is closed as illustrated in FIG. 2, water dropping to the bottom gathers in the gas-liquid separator 57 and gas flows out from the outflow pipe 59. In FIG. 2, water gathering in the gas-liquid separator 57 is illustrated by hatching.

Discharge of a fluid to the discharge passage 55 which is caused by opening the shut-off valve 54 will be described below. The shut-off valve 54 is closed in principle for the purpose of improvement in fuel efficiency.

When amounts of water, hydrogen, and nitrogen are discharged to the atmospheric air to prevent them from becoming excessively larger than reference amounts, the control unit 30 opens the shut-off valve 54. Control of opening and closing of the shut-off valve 54 for this purpose is referred to as normal opening and closing control.

For example, when an amount of water gathering in the gas-liquid separator 57 becomes excessively greater, the water flows out from the outflow pipe 59 or reflows to the inflow pipe 56. The water flowing out from the outflow pipe 59 flows into the hydrogen pump 53 and causes noise in the hydrogen pump 53. The water reflowing to the inflow pipe 56 flows into the fuel cell stack 40 and may hinder power generation. The water level gauge 130 measures a water level in the gas-liquid separator 57 and inputs the measured water level to the control unit 30. When the measured water level reaches a predetermined value, the control unit 30 opens the shut-off valve 54 to prevent water from reflowing to the inflow pipe 56.

When a hydrogen concentration in anode exhaust gas becomes excessively high, the hydrogen concentration may be greater than a concentration serving as a reference value when the shut-off valve 54 is opened to discharge hydrogen to the atmospheric air. The reference value is determined by Laws, Regulations, and the like. For the purpose of prevention thereof, when the hydrogen concentration reaches a predetermined value ((the reference value), the control unit 30 discharges hydrogen from the gas-liquid separator 57 to the atmospheric air by opening the shut-off valve 54.

When a concentration of nitrogen supplied to the anode of the fuel cell stack 40 becomes excessively high, the fuel cell stack 40 may deteriorate. Therefore, when the nitrogen concentration at the anode becomes high, the control unit 30 discharges nitrogen from the gas-liquid separator 57 to the atmospheric air by opening the shut-off valve 54.

Figure 3:
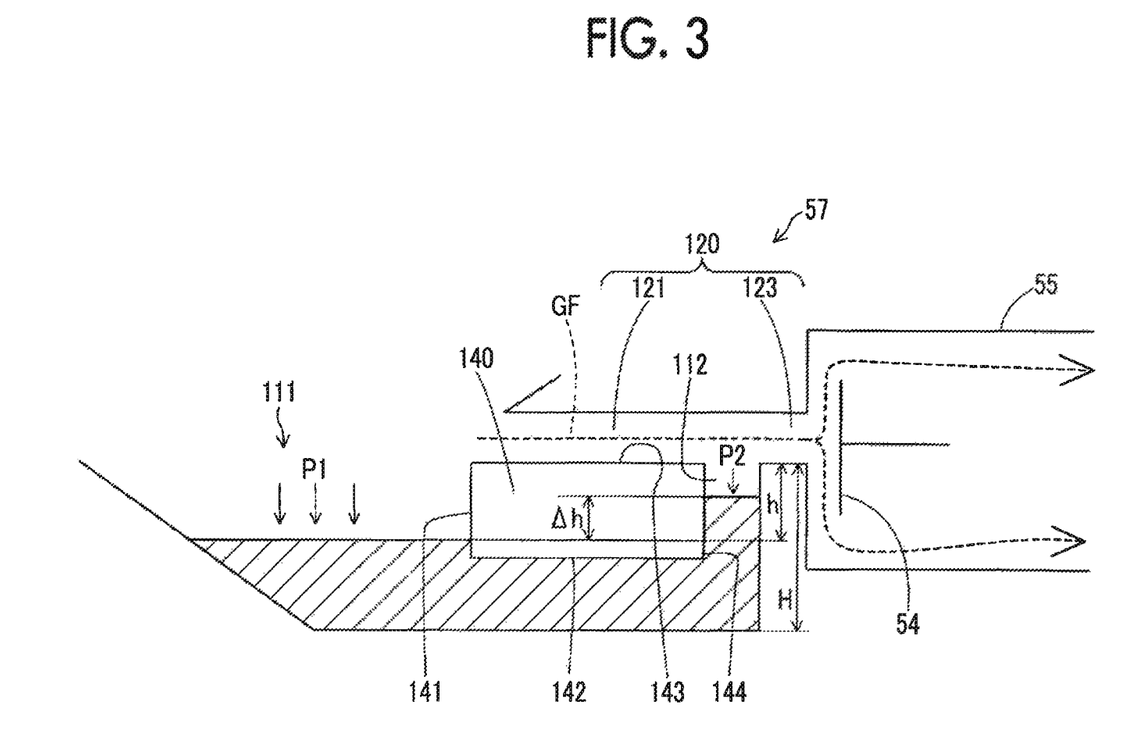
FIG. 3 is an enlarged sectional view of a lower part of the gas-liquid separator.

FIG. 3 is an enlarged view of a lower part of the gas-liquid separator 57. The water level gauge 130 is not illustrated. FIG. 3 illustrates a state in which gas is discharged by opening the shut-off valve 54. In FIG. 3, a state in which gas flows in the main passage 120 is indicated by a gas flow GF.

Figure 4:
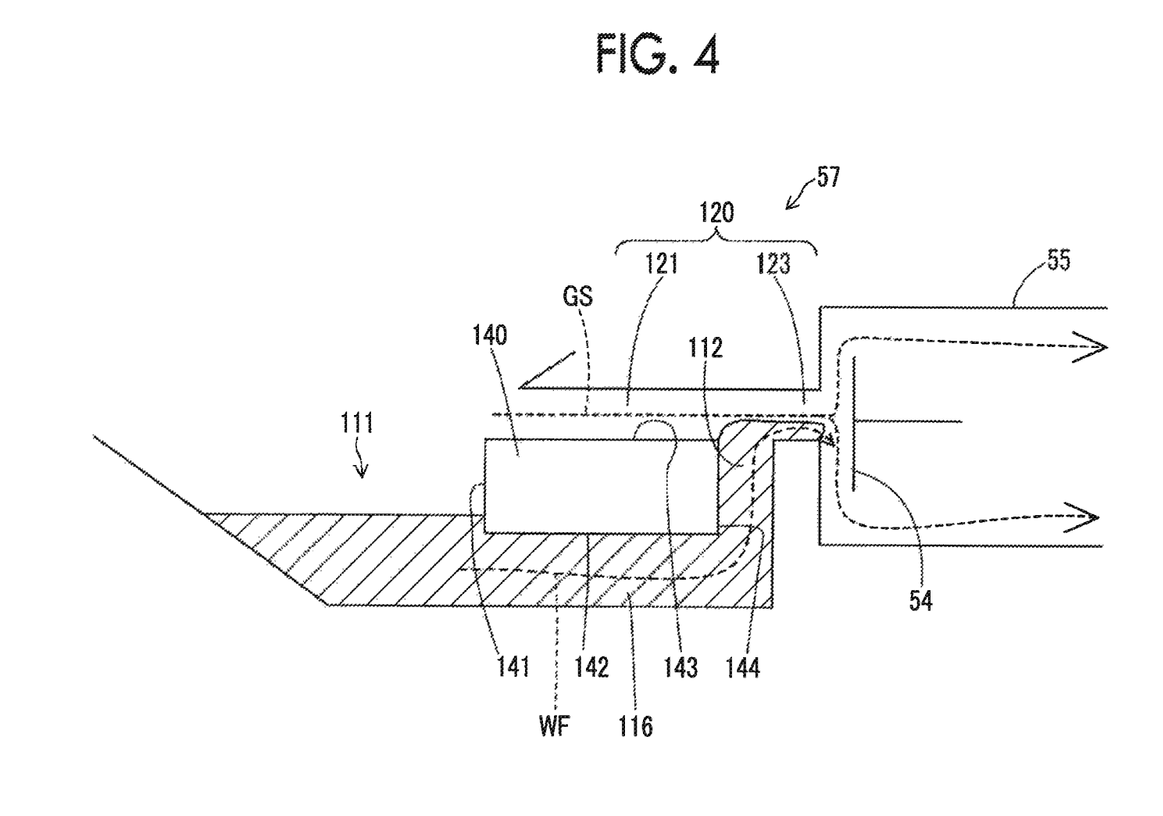
FIG. 4 is an enlarged sectional view of the lower part of the gas-liquid separator.

FIG. 4 illustrates a state in which water in addition to gas is discharged. The water level gauge 130 is not illustrated. In FIG. 4, a state in which water flows is indicated by a water flow WF. Description will be made below with reference to FIGS. 3 and 4.

A flow direction in the main passage 120 is a substantially horizontal direction. The main passage 120 is partitioned into an upstream portion 121 and a downstream portion 123. The upstream portion 121 is a portion upstream from a junction with a bypass passage 112 (which will be described later). That is, the junction is located between the upstream portion 121 and the shut-off valve 54.

The downstream portion 123 is a portion downstream from the junction with the bypass passage 112 and is a portion connected to the discharge passage 55. That is, the downstream portion 123 is located between the junction and the shut-off valve 54. The height of the bottom surface of the downstream portion 123 is a predetermined height H. The height mentioned herein refers to a height from the bottom surface of the gas-liquid separator 57.

The main function of the partition 140 is to form the upstream portion 121 and the bypass passage 112. The partition 140 will be described in detail.

The partition 140 includes a first wall 141, a second wall 142, a third wall 143, and a fourth wall 144. The third wall 143 forms a top surface of the partition 140. The second wall 142 forms a bottom surface of the partition 140. The first wall 141 and the fourth wall 144 form side surfaces of the partition 140. The first wall 141 is located upstream from the fourth wall 144. Upstream mentioned herein refers to upstream in a flow in the upstream portion 121.

The third wall 143 forms a bottom surface of the upstream portion 121. The first wall 141 forms a side surface of an open portion 111. The open portion 111 is a portion which is located upstream from an upstream edge of the main passage 120 in the flow direction in the main passage 120 in the vicinity of the bottom of the gas-liquid separator 57. Since the top of the vicinity of the water surface in the open portion 111 is open, a pipe flow does not occur unlike the main passage 120. Accordingly, when the shut-off valve 54 is opened, a flow speed in the vicinity of the water surface of the open portion 111 is lower than a flow speed of the gas flow GF.

The second wall 142 forms a part of an inner wall of a bottom passage 116. The bottom passage 116 is a passage between the partition 140 and the bottom surface of the gas-liquid separator 57 and is a passage connecting the open portion 111 and the bypass passage 112. A flow direction in the bottom passage 116 is a substantially horizontal direction.

The fourth wall 144 forms a part of an inner wall of the bypass passage 112. The bypass passage 112 is a passage joining to the main passage 120 from the downside (that is, the bottom surface side). The flow direction in the bypass passage 112 is a substantially vertical direction.

The principle and conditions in which the water surface in the bypass passage 112 becomes higher than the water surface of the open portion 111 and reaches the main passage 120 as illustrated in FIG. 4 will be described below.

The reason of the water surface in the bypass passage 112 being higher than the water surface in the open portion 111 is that a pressure applied to the water surface in the bypass passage 112 is smaller than a pressure applied to the water surface of the open portion 111. The reason for such a pressure difference is that the flow speed of the gas flow GF flowing in the main passage 120 is higher than the flow speed of gas in the vicinity of the water surface of the open portion 111. The detailed relationship thereof is as follows.

When the pressure applied to the water surface in the open portion 111 is defined as an open pressure P1 and the pressure applied to the water surface in the bypass passage 112 is defined as a passage pressure P2 as illustrated in FIG. 3, the following equation is established from Bernoulli's theorem.

$$P1/\rho_G g + v_1^2/2g = P2/\rho_G g + v_2^2/2g \tag{1}$$

$\rho_G$ denotes a density of gas, g denotes a gravitational acceleration, $v_1$ denotes a speed of gas on the water surface in the open portion 111, and $v_2$ denotes a flow speed of gas in the junction of the bypass passage 112 and the main passage 120.

Since $v_1^2 \ll v_2^2$ is satisfied as an actual condition, Equation (1) can be modified to Equation (2).

$$P2 = P1 - \rho_G v_2^2/2 \quad (2)$$

Since P2<P1 is established from Equation (2), the water surface in the open portion 111 is lower than the water surface in the bypass passage 112 as illustrated in FIGS. 3 and 4.

As illustrated in FIG. 3, a height from the water surface in the open portion 111 to the water surface in the bypass passage 112 is defined as Δh, and a height from the water surface in the open portion 111 to the bottom surface of the downstream portion 123 is defined as h. The height h can be acquired by subtracting a measured value of the water level gauge 130 from a predetermined height H.

When a density of water is defined as $\rho_W$ and $\rho_G \ll \rho_W$ is satisfied, the following equation is established.

$$P1 - P2 = \rho_W g \Delta h \quad (3)$$

Equation (3) can be modified to the following equation.

$$\Delta h = (P1 - P2)/\rho_W g \quad (4)$$

When Δh<h is satisfied, the water surface in the bypass passage 112 does not reach the main passage 120 as illustrated in FIG. 3. On the other hand, when Δh≥h is satisfied, the water surface in the bypass passage 112 reaches the main passage 120 as illustrated in FIG. 4. Since the density of water $\rho_W$ and the gravitational acceleration g can be considered to be constant, the magnitude correlation between the water level difference Δh and the height h can be acquired by measuring the open pressure P1 and the passage pressure P2. Alternatively, when the water level in the bypass passage 112 can be measured, it is possible to detect whether the water surface in the bypass passage 112 reaches the main passage 120 without acquiring the value of Δh.

However, in this embodiment, a manometer that measures the open pressure P1 and the passage pressure P2 or a water level gauge that measures the water level of the bypass passage 112 is not provided. Therefore, the magnitude correlation between the water level difference Δh and the height h is estimated using the following method.

The following equation is obtained by substituting Equation (2) into Equation (4).

$$\Delta h = (\rho_G/2\rho_W g) v_2^2 \quad (5)$$

When the density of gas $\rho_G$ and the speed $v_2$ can be estimated, the water level difference Δh can be acquired from Equation (5).

First, acquisition of the speed $v_2$ will be described below. The speed $v_2$ is acquired by estimating a flow rate in the main passage 120.

A volumetric flow rate $Q_G$ (Nm³/hour) of gas in a reference state passing through the shut-off valve 54 is expressed by Equations (6) and (7) using a Cv value in the case of gas as widely known. In the equations, P0 denotes an atmospheric pressure as a secondary pressure, G denotes a specific gravity when air is a standard substance, t denotes a temperature of gas (° C.), and ΔP denotes a pressure difference between the passage pressure P2 and the pressure P0. Equation (6) is established when ΔP<P2/2 is satisfied, and Equation (7) is established when ΔP≥P2/2 is satisfied.

$$Cv = Q_G \sqrt{[G(273+t)/\{\Delta P(P2+P0)\}]/2,916} \quad (6)$$

$$Cv = Q_G \sqrt{\{G(273+t)\}/2,519 P2} \quad (7)$$

The reference state includes conditions of 0° C. and 101.325 kPa·abs. The Cv value in the case of gas is a value when the volumetric flow rate of gas passing through the valve is expressed by USgal/min under a predetermined condition as widely known. The predetermined condition is that the pressure difference between upstream and downstream of the valve is 1 lbf/in² (≈6.9 kPa) and the temperature of gas is 60 degrees Fahrenheit (≈15.6° C.). 1 USgal/min is about 0.23 m³/hour.

When the Cv value, the atmospheric pressure P0, the passage pressure P2, the temperature of gas t, and the specific gravity of gas G can be seen, the volumetric flow rate $Q_G$ in the reference state is acquired from Equations (6) and (7). The acquired volumetric low rate $Q_G$ is converted into an actual volumetric flow rate using the passage pressure P2 and the temperature of gas t, and is further divided by a passage sectional area of the main passage 120 to acquire the speed $v_2$.

The Cv value of the shut-off valve 54 is acquired in advance. The atmospheric pressure P0 is measured by an barometer Patm. Since the temperature of gas t has a strong correlation with the measured value of the coolant thermometer Tc, the temperature of gas t is estimated using the measured value of the coolant thermometer Tc.

The specific gravity of gas is calculated from the composition of the gas. As described above, gas in the gas-liquid separator 57 mainly includes nitrogen, hydrogen, and steam.

The ratio of hydrogen is estimated in consideration of factors for an increase in an amount of hydrogen and factors for a decrease in an amount of hydrogen in anode exhaust gas. The factors for an increase in an amount of hydrogen include supply of hydrogen from the hydrogen tank 51. The amount of hydrogen supplied is estimated from the measured values of the high-pressure manometer Phh and the low-pressure manometer Phl and a flow rate of the injector 58.

The factors for a decrease in an amount of hydrogen include consumption of hydrogen by a power generation reaction in the fuel cell stack 40, leakage of hydrogen from the anode to the cathode in the fuel cell stack 40, and discharge of hydrogen from the gas-liquid separator 57. The amount of hydrogen consumed by the power generation reaction can be estimated by measuring a voltage value and a current value of a generated current. An amount of hydrogen leaking is less than the amount of hydrogen consumed by the power generation reaction and thus is ignored in this embodiment.

The ratio of nitrogen is estimated based on an amount of nitrogen leaking from the cathode to the anode in the fuel cell stack 40. The amount of nitrogen leaking is estimated based on an elapsed time from a time point at which the shut-off valve 54 is opened previously and an amount of air supplied to the cathode. The ratio of steam is estimated based on the temperature of gas t with a relative humidity of 100%. The density of gas $\rho_G$ is calculated from the above-acquired specific gravity G.

The passage pressure P2 is calculated from the open pressure P1 using Equation (2). The open pressure P1 is estimated from a supply pressure (a value which is acquired by the low-pressure manometer Phl). The open pressure P1 becomes lower than the supply pressure due to a pressure loss in the fuel cell stack 40 and consumption of hydrogen in the fuel cell stack 40. The degree of decrease in the open pressure can be estimated from a flow rate which is controlled by the injector 58, the measured value of the low-pressure manometer Phl, the amount of power generated in the fuel cell stack 40, and the like.

The speed $v_2$ and the density of gas $\rho_G$ which are acquired in this way are substituted into Equation (5) to acquire the water level difference $\Delta h$.

Figure 5:
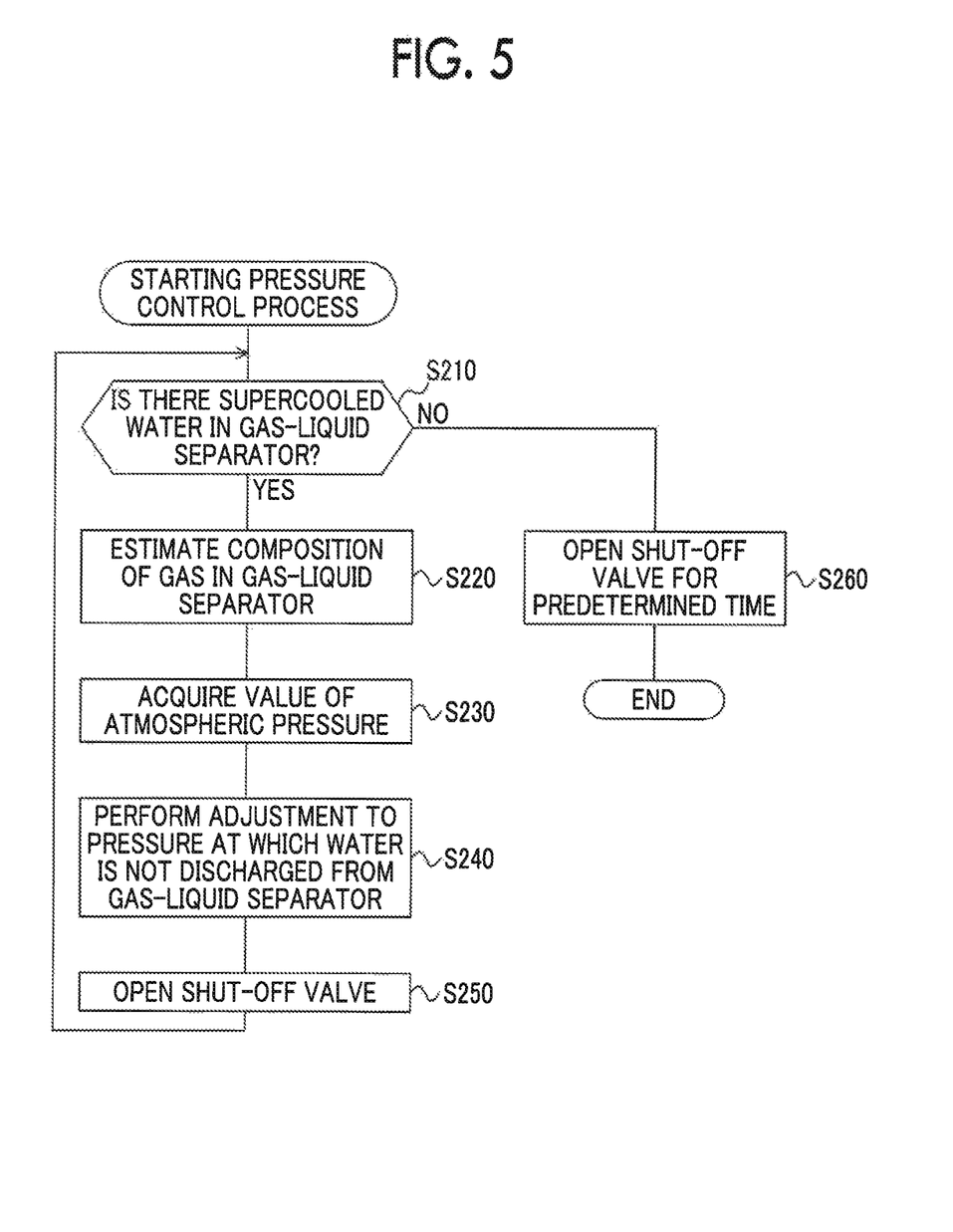
FIG. 5 is a flowchart illustrating a starting pressure control process.

FIG. 5 is a flowchart illustrating a starting pressure control process. The starting pressure control process is started by the control unit 30 when a power switch is turned on. The power switch is a user interface which is provided in the vehicle 1. A user pushes down the power switch when driving is started and when the vehicle 1 is parked. When the power switch is operated to start the driving, other processes for starting the fuel cell system 20 as a whole are started in parallel with the starting pressure control process.

A process when the power switch is operated to park the vehicle will be described before the starting pressure control process is described. When the power switch is operated to park the vehicle, various processes for transition to a parked state are performed. Such processes include a process of discharging water in the gas-liquid separator 57. Discharge of water in the gas-liquid separator 57 is performed by opening the shut-off valve 54 and increasing the pressure in the gas-liquid separator 57. The increase in pressure in the gas-liquid separator 57 is performed by increasing a flow rate from the injector 58. That is, the injector 58 is used as a gas control mechanism for controlling the pressure in the gas-liquid separator 57.

When water is discharged at the time of transition to the parked state, the discharge of water may be performed using the phenomenon $\Delta h > h$ as described above or the discharge of water may be performed by increasing the open pressure P1 such that was flows into the bottom passage 116 and the bypass passage 112. When gas flows into the bottom passage 116 and the bypass passage 112, the water level after being discharged is lower than the second wall 142.

Even when water in the gas-liquid separator 57 is discharged as described above, steam in the gas-liquid separator 57 is gradually condensed and water gathers in the gas-liquid separator 57 during parking. During parking, nitrogen in the cathode passes through the anode and thus an amount of nitrogen in the anode increases gradually. The starting pressure control process is based on the premise that amounts of water and nitrogen in the gas-liquid separator 57 increase during parking as described above. In this embodiment, it is not supposed that the water surface of water gathering during parking becomes higher than the height of the third wall 143.

When the starting pressure control process is started, it is estimated whether supercooled water is present in the gas-liquid separator 57 (S210). Supercooled water is water which is present as liquid at temperatures equal to or lower than a temperature at which the water should be iced as widely known.

In S210, it is estimated that supercooled water is present when the temperature of the thermometer Tp is lower than 0° C. This is because when the pressure in the gas-liquid separator 57 is one atmosphere in this embodiment and the vehicle is parked for a certain time, the temperature of the hydrogen pump 53 and the temperature of the gas-liquid separator 57 can be considered to be equal to each other. Accordingly, the thermometer Tp serves as an information acquiring unit that acquires information for estimating whether water in the gas-liquid separator 57 is in a supercooled state.

When it is estimated that supercooled water is not present in the gas-liquid separator 57 (S210: NO), the shut-off valve 54 is opened for a predetermined time (S260) and then the starting pressure control process is ended. The purpose of opening the shut-off valve 54 at the time of starting is to decrease the nitrogen concentration in the anode. As described above, there is a high likelihood that the nitrogen concentration in the anode will be increased during parking. When the nitrogen concentration in the anode is high, the fuel cell stack 40 may cause deterioration. Therefore, at the time of starting, the shut-off valve 54 is rapidly opened in principle.

When it is estimated that supercooled water is not present in the gas-liquid separator 57, the flow rate from the injector 58 is controlled to a value optimal for power generation in the fuel cell stack 40. Accordingly, when the shut-off valve 54 is opened, the values of the open pressure P1 and the passage pressure P2 are determined by the course of nature. Accordingly, the magnitude correlation between the water level difference $\Delta h$ and the height h is determined by the course of nature.

When the starting pressure control process is ended, opening and closing of the shut-off valve 54 is determined by the above-mentioned normal opening and closing control.

On the other hand, when it is estimated that supercooled water is present in the gas-liquid separator 57 (S210: YES), the composition of gas in the gas-liquid separator 57 is estimated (S220). S220 is performed to acquire the specific gravity of gas G and the density of gas $\rho_G$ as described above.

Then, the value of the atmospheric pressure is acquired (S230). Specifically, the measured value of the barometer Patm is acquired. The value of the atmospheric pressure is substituted as the pressure P0 into Equation (6).

Then, the passage pressure P2 in the gas-liquid separator 57 is controlled to a value at which water is not discharged (S240). Specifically, feedback control of the measured value of the low-pressure manometer Phl is started such that $\Delta h < h$ is satisfied. This control is performed by controlling the flow rate of hydrogen from the injector 58.

Subsequently, the shut-off valve 54 is opened (S250), and then the process returns to S210. While the determination result of S210 is YES, S210 to S250 are repeatedly performed. S250 in the second or subsequent processes is replaced with a step of maintaining the open state of the shut-off valve 54.

When S210 to S250 are repeatedly performed, the temperature of water in the gas-liquid separator 57 increases. This is because the temperature of fluid flowing from the inflow pipe 56 is higher than 0° C.

When it is estimated that supercooled water is not present in the gas-liquid separator 57 (S210: NO), S260 is performed. When S260 is performed after S250 is performed, the predetermined time in S260 counts from the start time of S250.

The determination method of S210 in the second or subsequent process after the determination result of S210 in the first process is YES may be the same as the determination method of S210 in the first process or may not be different therefrom. When a certain time elapses from the starting of the fuel cell system 20, there is a high likelihood that the measured value of the thermometer Tp will be separated from the temperature of water in the gas-liquid separator 57. Accordingly, when the determination of S210 is performed after a certain time elapses from the starting of the fuel cell system 20, the temperature of anode exhaust gas which is estimated from the acquired value of the coolant thermometer Tc and the elapsed time from the starting of the fuel cell system may be considered.

According to the above-mentioned embodiment, it is possible to discharge nitrogen from the anode at the time of starting of the fuel cell system 20 and to prevent supercooled water present in the gas-liquid separator 57 from being attached to the shut-off valve 54. In addition, it is possible to prevent ice from being attached to the shut-off valve 54 to hinder the opening and closing operation of the shut-off valve 54.

The present disclosure is not limited to the embodiment, examples, and modified examples in this specification, but can be embodied in various configurations without departing from the gist thereof. For example, technical features of the embodiment, the examples, and the modified examples corresponding to the technical features in the aspects which have been described in the SUMMARY can be appropriately replaced or combined. When the technical features are described not to be essential in this specification, the technical features can be appropriately deleted. Examples thereof will be described below.

Various methods can be employed as the method of determining whether the water surface in the bypass passage 112 reaches the main passage 120. For example, as described above, the water level gauge may be provided in the bypass passage 112 or the open pressure P1 and the passage pressure P2 may be measured and substituted into Equation (3) to acquire the water level difference Δh.

In order to calculate the speed $v_2$, the composition of gas, the temperature of gas t, the specific gravity of gas, the density of gas $\rho_G$, and the like which are described above in the embodiment may not be performed. For example, a thermometer that measures the temperature of gas t in the gas-liquid separator may be provided. Alternatively, the temperature t, the density $\rho_G$, and the like may be considered to be fixed values. The atmospheric pressure may be considered to be a fixed value.

The method of controlling the open pressure P1 or the passage pressure P2 may be changed. For example, when the rotation speed of the hydrogen pump 53 increases, the pressure in the gas-liquid separator 57 decreases and thus control of the rotation speed of the hydrogen pump 53 may be used for control of the open pressure P1. Alternatively, a variable diaphragm may be provided in the inflow pipe 56 or the outflow pipe 59.

The measured value of the low-pressure manometer Phl at the time of starting of the fuel cell system 20 may be used as information for estimating presence of supercooled water. As widely known, whether there is supercooled water depends on a pressure. At the time f starting of the fuel cell system 20, the measured value of the low-pressure Manometer Phl is almost equal to the open pressure P1.

The vehicle 1 may be a connected car. A connected car is an automobile in which a communication device is mounted and which can be serviced by cloud communication.

When the vehicle 1 is a connected car, the information for estimating presence of supercooled water may be acquired via the Internet. For example, a change of an outside air temperature from a time point at which parking of the vehicle 1 is started to a time point at which the vehicle 1 is started may be acquired as the information for estimating presence of supercooled water.

When the vehicle 1 is a connected car, the value of the atmospheric pressure may be acquired via the Internet.

When presence of supercooled water is estimated, discharge of water from the gas-liquid separator 57 may be performed. For example, when presence of supercooled water is estimated, discharge of water may not be performed immediately after the shut-off valve 54 is opened and then discharge of water may be started in a later state in which it is estimated that supercooled water remains. When discharge of water is performed in the state in which it is estimated that supercooled water remains, it is preferable that the open pressure P1 be set to be lower than that in the state in which it is estimated that supercooled water is not present. When the open pressure P1 is set to be lower, the water level difference Δh decreases and thus the amount of water discharged per unit time decreases. As a result, even when supercooled water is attached to the shut-off valve 54, the shut-off valve 54 is hardly iced.

What is claimed is:

1. A fuel cell system comprising:
   a gas-liquid separator configured to separate water and gas which flows from a fuel cell stack;
   a discharge passage connected to the gas-liquid separator to discharge a fluid from the gas-liquid separator to atmospheric air;
   a valve disposed between the gas-liquid separator and the discharge passage;
   a gas control mechanism configured to change a pressure of gas in the gas-liquid separator, the gas control mechanism including an injector;
   an information acquiring unit configured to acquire information for estimating a temperature of water in the gas-liquid separator, the information acquiring unit including a thermometer; and
   an electronic control unit configured to control the gas control mechanism using the information acquired by the information acquiring unit,
   wherein the gas-liquid separator includes
     a main passage configured for the fluid to flow to the valve in a horizontal direction at a predetermined height from a bottom surface of the gas-liquid separator, and
     a bypass passage configured to join to the main passage in a vertical direction from a bottom surface side located lower than the main passage, and
   wherein the electronic control unit is configured to control a pressure in the gas-liquid separator using the gas control mechanism such that a water surface in the bypass passage is lower than the predetermined height when the information indicates that water in the gas-liquid separator is in a supercooled state and the valve is opened.

2. The fuel cell system according to claim 1, further comprising an atmospheric pressure acquiring unit configured to acquire a value of an atmospheric pressure, the atmospheric pressure acquiring unit including a barometer, wherein the electronic control unit is configured to control the pressure in the gas-liquid separator based on the value acquired by the atmospheric pressure acquiring unit.

3. The fuel cell system according to claim 2, wherein the electronic control unit is configured to control the pressure in the gas-liquid separator such that the pressure has a value at which water is not discharged based on the value acquired by the atmospheric pressure acquiring unit.

4. The fuel cell system according to claim 3, wherein the electronic control unit is configured to open the valve after the pressure in the gas-liquid separator is controlled such that the pressure has the value at which water is not discharged and to estimate whether water in the gas-liquid separator is in the supercooled state.

5. The fuel cell system according to claim 1, wherein the injector is configured to supply hydrogen to the fuel cell stack from a hydrogen tank.

6. The fuel cell system according to claim 1, wherein the electronic control unit is configured to perform control of the pressure in the gas-liquid separator when the fuel cell system is started.

7. The fuel cell system according to claim 1, wherein the electronic control unit is configured to open the valve for a predetermined time when it is estimated that water in the gas-liquid separator is not in the supercooled state and to end control of the pressure in the gas-liquid separator.

* * * * *